United States Patent

Rottmaier et al.

[11] 4,283,546
[45] Aug. 11, 1981

[54] 1,2,4-TRIGLYCIDYL TRIAZOLIDINES-3,5-DIONES AND A PROCESS FOR THE PREPARATION THEREOF

[75] Inventors: Ludwig Rottmaier, Odenthal-Gloebusch; Rudolf Merten, Leverkusen, both of Fed. Rep. of Germany

[73] Assignee: Bayer Aktiengesellschaft, Fed. Rep. of Germany

[21] Appl. No.: 182,110

[22] Filed: Aug. 28, 1980

[30] Foreign Application Priority Data

Sep. 1, 1979 [DE] Fed. Rep. of Germany ....... 2935354

[51] Int. Cl.³ .................. C07D 405/14; C08G 59/32; C08G 59/42; C08G 59/62
[52] U.S. Cl. ..................................... 548/264; 8/115.6; 106/287.27; 428/245; 428/265; 528/367; 528/289
[58] Field of Search ......................................... 548/264

[56] References Cited

U.S. PATENT DOCUMENTS 2,708,162  5/1955  Carroll et al. ........................ 430/602

FOREIGN PATENT DOCUMENTS 1104965  4/1961  Fed. Rep. of Germany ........... 548/264

*Primary Examiner*—Alton D. Rollins
*Attorney, Agent, or Firm*—Connolly and Hutz

[57] ABSTRACT

A compound which corresponds to the following general formula I

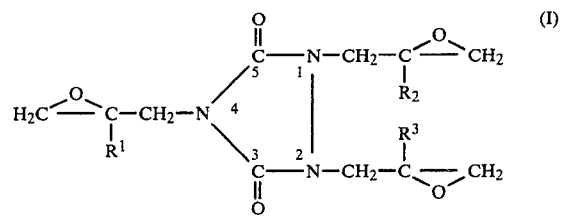

wherein $R^1$, $R^2$, and $R^3$ which may be the same or different, each represents hydrogen or methyl, and a process for the preparation thereof which comprises reacting triazolidine-3,5-dione with an at least equivalent quantity of an epihalohydrin or β-methyl epihalohydrin and reacting the resulting material with a hydrogen halide acceptor.

7 Claims, No Drawings

1,2,4-TRIGLYCIDYL TRIAZOLIDINES-3,5-DIONES AND A PROCESS FOR THE PREPARATION THEREOF

This invention relates to new 1,2,4-triglycidyl triazolidine-3,5-diones corresponding to the following general formula:

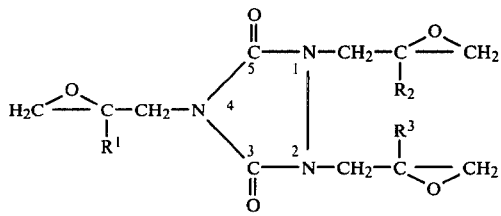

wherein $R^1$, $R^2$ and $R^3$, which may be the same or different, each represents hydrogen or methyl, preferably hydrogen. The present 1,2,4-triglycidyl triazolidine-3,5-diones corresponding to above general formula (I) are obtained by reacting triazolidine-3,5-dione corresponding to the following formula:

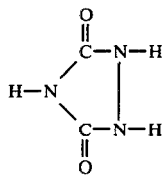

with an epihalohydrin or β-methyl halohydrin, such as epichlorohydrin, epibromohydrin or β-methyl epichlorohydrin, optionally in the presence of a suitable catalyst, or (with 1,3-dihalohydrin propane in the presence of hydrogen halide acceptors) using known methods and subsequently removing hydrogen halide by treatment with hydrogen halide acceptors. The triglycidyl triazolidine-3,5-diones may also be prepared in a single stage by reacting triazolidine-3,5-dione with an epihalohydrin or with 1,3-dihalohydrin propane in the presence of hydrogen halide acceptors, such as sodium or potassium hydroxide.

The triazolidine-3,5-dione used for preparing the new triglycidyl compounds corresponding to above general formula (I) is known and may be obtained, for example, by heating hydrazine-N,N'-dicarboxylic acid diamide to beyond 200° C. with elimination of ammonia.

In the preferred two-stage process, in a first-stage, triazolidine-3,5-dione is reacted with an epihalohydrin in the presence of basic, acidic or neutral catalysts to form a halohydrin compound corresponding to the following general formula:

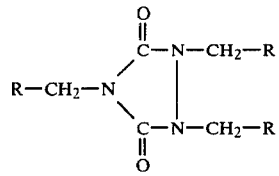

wherein the radicals R independently represent radicals which may be converted into 1,2-epoxy ethyl radicals. One such radical R which is capable of being converted into a 1,2-epoxy ethyl radical is, in particular, a hydroxy haloethyl radical carrying functional groups on various carbon atoms, such as the 2-chloro-1-hydroxy or 2-methyl-2-chloro-1-hydroxy ethyl radicals.

The catalysts preferably used for the addition of the halohydrin are tertiary amines and/or quaternary ammonium salts, such as trimethyl benzyl ammonium hydroxide, tetraethyl ammonium chloride, trimethyl benzyl ammonium chloride and trimethyl phenyl ammonium chloride; triethylamine, tri-n-butylamine, triethanolamine, N,N'-dimethylaniline, benzyl dimethylamine, pyridine, endoethylene piperazine and N,N'-dimethyl piperazine.

Conventional commercial basic ion exchanger resins containing tertiary or quaternary amino groups and acid amide groups are also suitable catalysts.

Other suitable catalysts are low molecular weight thioethers and/or sulphonium salts thereof, such as diethyl sulphide, dibenzyl sulphide, β-hydroxy ethyl ethyl sulphide, thiodiglycol and dibenzyl methyl sulphonium bromide and compounds which are capable of being converted into thioethers or sulphonium derivatives thereof by reaction with epihalohydrin, such as hydrogen sulphide, sodium sulphide or mercaptans.

It is also possible to use alkali metal and alkaline earth metal salts, such as lithium chloride and calcium thiocyanate.

The catalyst is preferably used in a quantity of from 0.01 to 5 mole percent, based on triazolidine-3,5-dione.

The halohydrin compound corresponding to above general formula (III) may also be obtained by reacting triazolidine-3,5-dione with a 1,3-dihalohydrin propane, such as 1,3-dichloro-2-propanol or 2-methyl-1,3-dichloro-2-propanol, in the presence of hydrogen halide acceptors, such as alkali metal or alkaline earth metal hydroxides, for example sodium and barium hydroxide, alkali metal or alkaline earth metal carbonates, for example, sodium carbonate and calcium carbonate, and tert.-amines, such as triethylamine.

The reaction of the triazolidine-3,5-dione with the epihalohydrin is carried out using at least equivalent quantities of epihalohydrin, i.e. 1 mole of triazolidine-3,5-dione is reacted with at least 3 moles of epihalohydrin. However, it is preferred to use an excess of epihalohydrin of from 4 to 60 moles, more particularly from 10 to 30 moles of epihalohydrin per mole of triazolidine-3,5-dione. For economic reasons, the quantity of epihalohydrin will, of course, be kept as small as possible.

The reaction between triazolidine-3,5-dione and epihalohydrin is generally carried out at a temperature of from 20° to 200° C., preferably from 50° to 160° C., optionally under elevated pressure.

The reaction times are generally between 30 minutes and several days, although, in certain cases, they may be longer or shorter. Shorter reaction times are obtained by suitably selecting the reaction conditions, for example with regard to pressure.

In principle, the reaction of the triazolidine-3,5-dione with the epihalohydrin or β-methyl halohydrin may even be carried out in the absence of catalysts, although higher temperatures and/or longer reaction times than indicated above are necessary in that case.

Thereafter, the halohydrin compound, primarily the trichlorohydrin triazolidine-3,5-dione which may contain certain quantities of glycidyl compounds, depending on the excess of epihalohydrin or β-methyl halohydrin, is dehydrohalogenated in a second stage using hydrogen halide acceptors to form the 1,2,4-triglycidyl triazolidine-3,5-dione.

The alkaline-reacting compounds used for removing hydrogen halide are, in particular, alkali metal or alkaline earth metal hydroxides, such as sodium hydroxide, potassium hydroxide and calcium hydroxide, preferably sodium hydroxide. It may be used in solid form or in solution, preferably in the form of from 20 to 50% by weight solutions.

Other suitable hydrogen halide acceptors are alkali metal carbonates, particularly soda and potassium carbonate, in solid or dissolved form, alkali metal silicates, alkali metal phosphates, alkali metal aluminates and excess epihalohydrin or 1,2-alkylene oxides, such as ethylene oxide. Where epichlorohydrin is used, it is converted into glycerine dichlorohydrin.

From 3 to 3.5 equivalents of the hydrogen halide acceptors are used per mole of halohydrin in the triazolidine-3,5-dione corresponding to above general formula (III).

During the elimination of hydrogen halide, the pH should preferably not exceed 13, more preferably not exceed 11. To achieve this, the alkali is gradually added or the solution is slowly added dropwise, the pH of the reaction mixture being controlled during the addition.

The elimination of hydrogen halide may be carried out at temperatures of from 20° to 120° C. Where the elimination of hydrogen halide is carried out using an alkali, for example potassium hydroxide, the reaction temperature should not exceed 70° C. if optimal yields are to be obtained. The best results are obtained at temperatures of from 30° to 35° C. Where alkali metal carbonates are used, however, the reaction temperature should be above 70° C., the maximum limit generally being imposed by the boiling point of the excess epihalohydrin.

So far as the dehydrohalogenation step is concerned, it is advantageous to add a water-immiscible organic solvent in order to be able to remove azeotropically the water formed during the reaction and the water added dropwise through the alkali solution. The quantities of solvent added are not critical. Suitable solvents are chlorinated hydrocarbons, such as methylene chloride, chloroform, ethylene chloride or trichloroethylene. Where a large excess of epihalohydrin was used for the formation of the triazolidine-3,5-dione chlorohydrin compounds, the excess epihalohydrin may function as the water-immiscible solvent.

In one particularly preferred embodiment, in a first stage, triazolidine-3,5-dione is reacted with epihalohydrin, preferably epichlorohydrin, in the presence of a catalyst, preferably a tertiary amine, a quaternary ammonium base, a quaternary ammonium salt or an organic sulphide or sulphonium salt, and, in a second stage, the halohydrin group-containing triazolidine-3,5-dione formed is treated with hydrogen halide acceptors, particularly alkali metal alkaline earth metal hydroxides or alkali metal carbonates in solid or dissolved form. The 1,2,4-triglycidyl triazolidine-3,5-diones are generally worked-up by removing the secondary product formed during the elimination of hydrogen halide, for example sodium chloride where sodium hydroxide is used as acid acceptor, by filtration under suction. Any residues of sodium chloride and alkali still present are removed by washing with water. However, all the sodium chloride and any alkali residues still present may, of course, also be directly removed by washing with water, i.e. without the preliminary step of filtration under suction. The remaining solution, which may first be dried over a suitable drying agent, such as anhydrous sodium sulphate, is then removed, optionally in vacuo, from the solvent, for example excess epichlorohydrin, which may be re-used in the following batches, and the pale-yellow to yellow coloured viscous oil obtained is crystallised by dissolution in suitable solvents, such as $C_1$–$C_4$ alkanols, preferably methanol, ketones, such as butanone, glycol and diglycol monoethers or acetates thereof, such as ethylene glycol monomethyl ether, diethylene glycol monoethyl ether and ethylene glycol monomethyl ether acetate, followed by cooling.

The crystalline compound obtained, a substantially pure triglycidyl triazolidine-3,5-dione, is filtered off under suction and may optionally be further purified by recrystallization, for example from methanol. In many cases, however, there is no need for purification, i.e. the crude product may be further processed as such.

The triglycidyl triazolidine-3,5-diones (crude product) obtained in accordance with the present invention have epoxide values of from 0.6 to 1.13, preferably from 0.85 to 1.13. The "epoxide value" is to be understood to be the number of epoxide equivalents contained in 100 g of substance. The "epoxide equivalent" is defined as the quantity of substance in grams which contains one 1,2-epoxide group. One 1,2-epoxide group is equivalent to one mole of hydrogen halide.

Pure 1,2,4-triglycidyl triazolidine-3,5-dione (formula I, $R^1$, $R^2$, and $R^3$=hydrogen) has an epoxide value of 1.13. Lower epoxide values mean the presence of oligomeric products, i.e. products with higher molecular weights. A 1,2,4-triglycidyl triazolidine-3,5-dione having an epoxide value of 0.93 (Example 1), e.g., contains about 80% by weight of pure compound of formula I ($R^1$, $R^2$, $R^3$=H) having a melting point of 103° to 104° C.

The oligomeric products are formed during the production of 1,2,4-triglycidyl triazolidine-3,5-dione by reaction of active hydrogen atoms attached to nitrogen atoms of 1,2,4-triazolidine-3,5-dione, mono- or diglycidyl triazolidine-3,5-dione or mixtures thereof with 1,2-epoxide groups (glycidyl groups) of mono-, di- or triglycidyl triazolidine-3,5-dione or mixtures thereof and/or with the precursors of 1,2-epoxide groups, i.e. halohydrin groups.

The crude 1,2,4-triglycidyl triazolidine-3,5-dione may still contain saponifiable halogen (up to about 5% by weight of chlorine and up to about 13% by weight of bromine) which, if desired, may be further reacted with a hydrogen halide acceptor. All halogen may be practically removed, whereby an increasing epoxide value may be obtained.

The polyglycidyl compounds produced in accordance with the present invention may be used on their own or together with conventional hardeners, such as polyamines, polycarboxylic acids and anhydrides thereof, polyamidoamines, polyphenols, aminoplast and phenoplast resins, boron trifluoride complexes, etc, as impregnating agents for textiles, for example, fibres of polyesters, as coating compositions, for example for glass, metals and wood, as adhesives for plastics of various types, for example for bonding non-woven textile-like materials, and for the production of shaped articles, for example castings, pressings and laminates.

The present invention is illustrated by the following Examples in which the percentages quoted represent percent, by weight, and the parts, parts by weight, unless otherwise indicated.

EXAMPLE 1

In a 4-liter three-necked flask equipped with a stirrer, thermometer and reflux condenser, 101 g (1 mole) of triazolidine-3,5-dione, 2775 g (30 moles) of epichlorohydrin and 2 ml of triethylamine are heated to 80° C. by means of an oil bath. The mixture reacts exothermically so that the oil bath may be removed. After the exothermic reaction has abated, the reaction mixture is stirred at 80° C. The total reaction time is 10 hours at 80° C. 250 g of 50% sodium hydroxide solution are added dropwise to the solution obtained over a period of 4 hours at from 30° to 40° C. in such a way that the water added and the water formed during the reaction is continuously removed by azeotropic distillation at from 30 to 60 Torr using a water separator. To complete the reaction, the reaction mixture is stirred for another hour and the sodium chloride formed is separated by filtration. The sodium chloride is washed twice with 200 g of epichlorohydrin and the combined epichlorohydrin solutions are washed with 200 ml of water. After the organic phase has been dried over sodium sulphate, the solvent is removed by concentration in a rotary evaporator and the residue is dried, ultimately at 80° C./0.2 mbar, to constant weight. 240 g of a light brown viscous oil are obtained. It was found to have an epoxide value of 0.93 and has a chlorine content of 2.75% (total chlorine). The viscous oil crystallises after standing for from a few hours to days. The practically pure 1,2,4-triglycidyl triazolidine-3,5-dione melting at from 98° to 103° C. crystallises by dissolution in methanol and cooling to 5° C. IR- and NMR-spectra in conjunction with elemental analysis and epoxide determination confirm the assumed structure.

Calculated: C=49.1%; H=5.57%; N=15.6%. Observed: C=49.0%; H=5.6%; N=15.5%. Calculated: epoxide value=1.13%. Observed: epoxide value=1.10%.

EXAMPLE 2

In a 60-liter vessel equipped with a stirrer, thermometer and reflux condenser, 50 kg of epichlorohydrin, 4.04 kg of triazolidine-3,5-dione and 80 g of tetraethyl ammonium chloride are stirred for 10 hours at 80° C., periodic cooling being necessary. 5 kg of powdered sodium hydroxide are then added in portions of the thus-obtained clear solution over a period of 6 hours at 30° C., followed by stirring for 2 hours at 30° C. The sodium chloride formed is filtered off under suction, the organic phase is concentrated in vacuo at 60° C. and the residue obtained is dried, ultimately at 60° C./0.2 mbar. 9.2 kg of a light brown viscous oil having an epoxide value of 0.95 and a chlorine content of 2.3% (total chlorine) are obtained. This oil solidifies within a few hours to form a solid mass from which the pure triglycidyl triazolidine-3,5-dione may be obtained by recrystallization from methanol.

EXAMPLE 3

40 kg of epichlorohydrin which was recovered from Example 2 are reacted with 4.04 kg of triazolidine-3,5-dione and 80 g of tetraethyl ammonium chloride in the same way as in Example 2. Working-up in the same way gives 9.35 kg of a brownish oil which solidifies after a few hours and which has an epoxide value of 0.93 and a chlorine content of 3.1%.

EXAMPLE 4

1400 g of epichlorohydrin, 202 g of triazolidine-3,5-dione and 4 g of tetraethyl ammonium chloride are reacted for 10 hours at 80° C. in the same way as in Example 1. 246 g of powdered sodium hydroxide are added in portions to the solution obtained over a period of 6 hours at 30° C., followed by stirring for 2 hours at 30° C. The sodium chloride formed is separated by filtration under suction and the organic phase is extracted by shaking with 100 ml of water and concentrated. After drying, ultimately at 60° C./0.2 mbar, 436 g of residue are obtained which solidifies within a few hours to form a solid, almost white mass having an epoxide value of 0.93 and a chlorine content of 4.6% (total chlorine).

EXAMPLE 5

202 g of triazolidine-3,5-dione, 740 g of epichlorohydrin and 4 g of tetraethyl ammonium chloride are reacted for 10 hours at 80° C. in the same way as in Example 4. The solution obtained is diluted with 500 ml of methylene chloride, 246 g of powdered sodium hydroxide are added in portions over a period of 6 hours at 30° C. and the mixture is then stirred for 2 hours at 30° C. The residue is filtered off under suction, the organic phase is extracted by shaking with 100 ml of water and then concentrated. After drying, ultimately at 60° C./0.2 mbar, 338 g of an almost colourless oil having an epoxide value of 0.99 and a chlorine content of 3.5% (total chlorine) are obtained. This oil solidifies on cooling to form a solid, substantially white mass. Pure 1,2,4-triglycidyl triazolidine-3,5-dione (formula I, $R^1$, $R^2$, and $R^3$=hydrogen) melting at 103°–104° C. and having an epoxide value of 1.13 is obtained by two-fold recrystallization from methanol.

EXAMPLE 6

200 g of the crude 1,2,4-triglycidyl triazolidine-3,5-dione having an epoxide value of 0.99 and a chlorine content of 3.5%, are dissolved in 300 g of methylene chloride and heated under reflux. An equivalent amount, based on the chlorine content, of an aqueous, 45% by weight solution of sodium hydroxide is dropwise added thereto and water is continuously removed by azeotropical distillation. When the reaction is completed the reaction mixture is filtered and the organic phase is washed twice with 200 ml of an aqueous, 1% by weight solution of primary sodium dihydrogen phosphate. After removing both solvent and residual water, ultimately at 80° C./0.3 mbar, 186 g of a light yellow oil are obtained which solidifies within a few hours to form a solid, white mass having an epoxide value of 1.01 and a chlorine content of 0.6% (total chlorine).

EXAMPLE 7

100 g of 1,2,4-triglycidyl triazolidine-3,5-dione and 171 g of hexahydropthalic acid anhydride, separately melted, are blended at 110° C. and poured into a mould. After curing 4 hours at 80° C. and 16 hours at 160° C., test samples are prepared from which the following properties are obtained:

| | |
|---|---|
| Flexural strength after DIN 53 452 (N/mm$^2$) | 148 |
| Deflection at rupture after DIN 53 452 (mm) | 3.2 |
| Impact strength after DIN 53 453 (kJ/m$^2$) | 11.8 |
| Ball indentation hardness after DIN 53 456 (N/mm$^2$) | 240 |

| -continued | |
|---|---|
| Martens temperature after DIN 53 453 (°C.) | 183 |

We claim:

1. A composition having an epoxide value of from 0.6 to 1.13 and consisting essentially of a compound which corresponds to the following general formula I

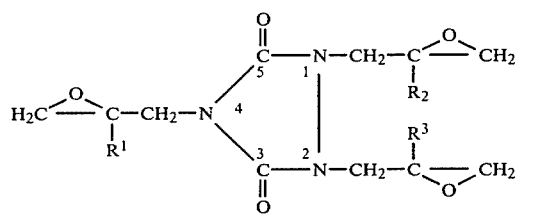

wherein $R^1$, $R^2$, and $R^3$, which may be the same or different, each represents hydrogen or methyl as main component and oligomeric by-products, which are formed during the production of the above compound by reaction of 1,2,4-triazolidine-3,5-dione with an at least equivalent quantity of an epihalohydrin or β-methyl epihalohydrin and subsequent reaction of the resulting material with a hydrogen halide acceptor.

2. A compound of the general formula, as claimed in claim 1.

3. A process for the preparation of a composition as claimed in claim 1, which comprises reacting triazolidine-3,5-dione with an at least equivalent quantity of an epihalohydrin or β-methyl epihalohydrin and reacting the resulting material with a hydrogen halide acceptor.

4. A process for the preparation of a compound, as claimed in claim 1, which comprises reacting triazolidine-3,5-dione with a dihalohydrin propane in the presence of a hydrogen halide acceptor.

5. A process, as claimed in claim 3, in which a catalyst is used for the epihalohydrin reaction.

6. A process, as claimed in claim 3, in which the epihalohydrin is epichlorohydrin.

7. A process, as claimed in claim 6, in which from 4 to 60 moles of epichlorohydrin are used per mole of triazolidine-3,5-dione.

* * * * *